Patented Aug. 13, 1946

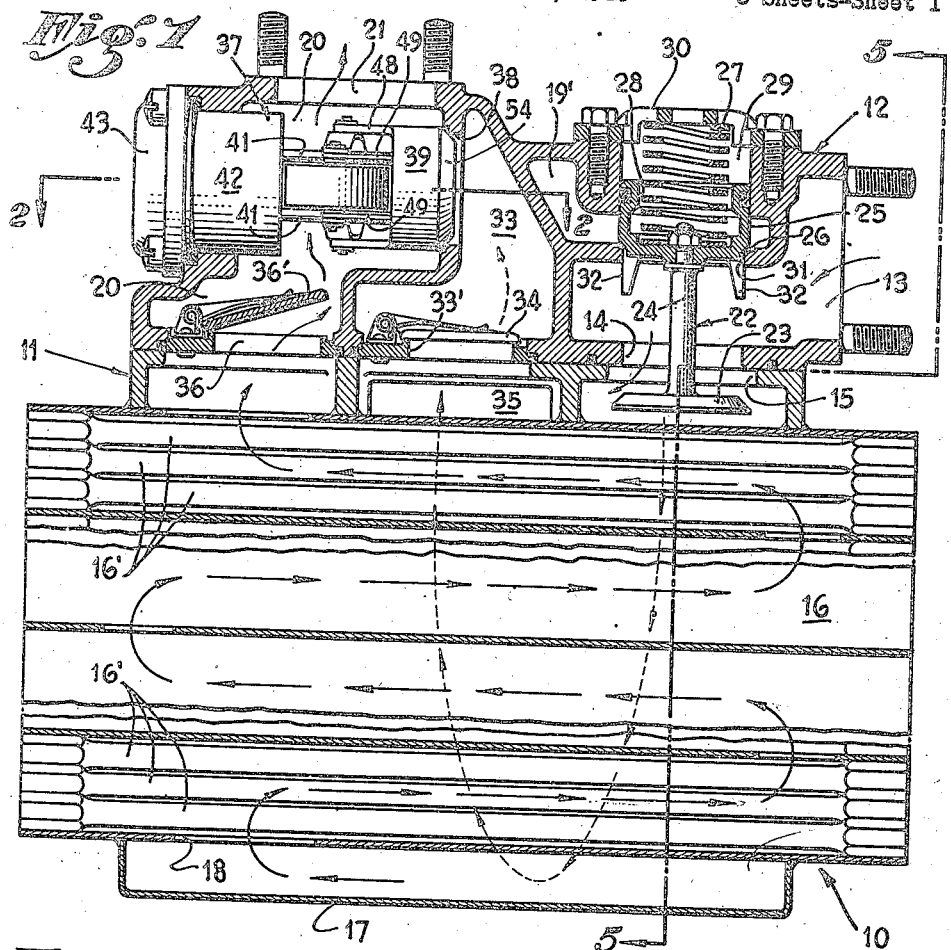
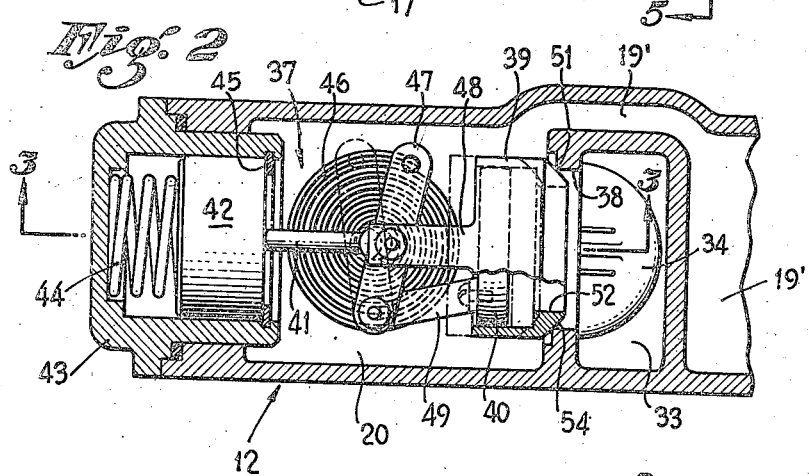

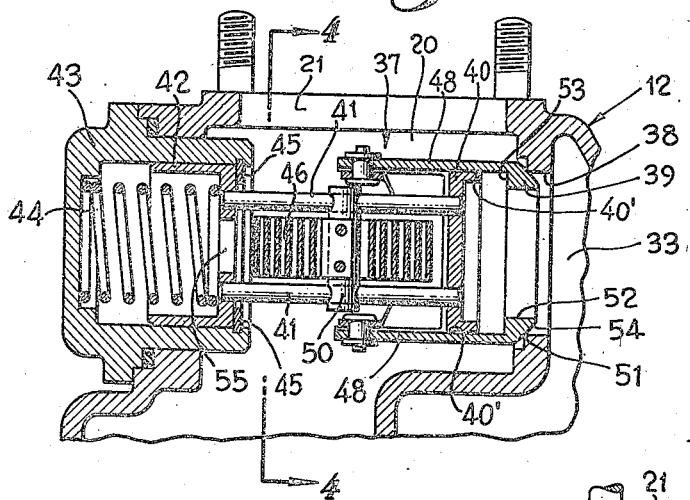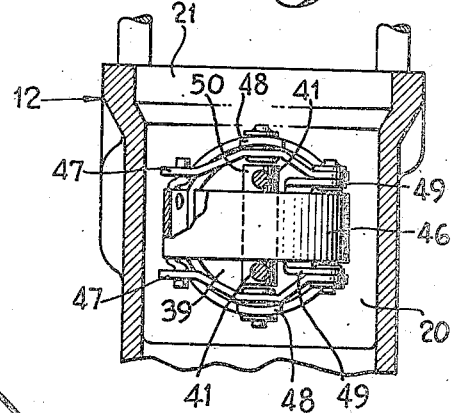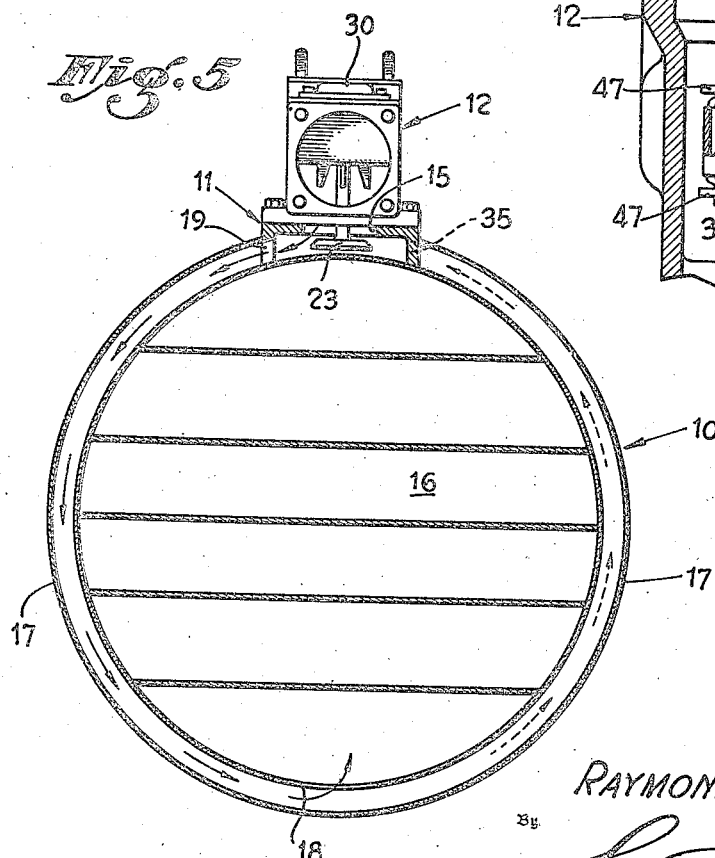

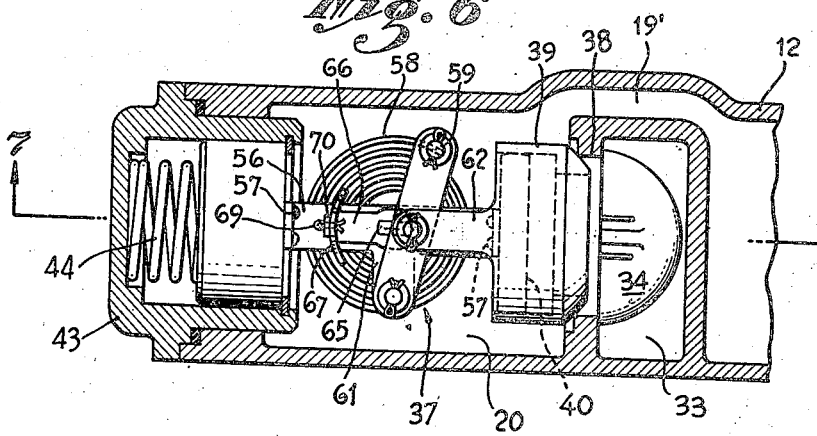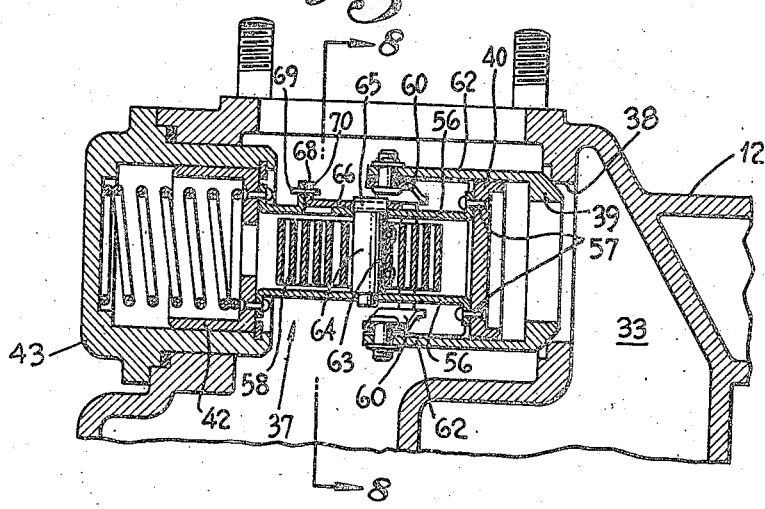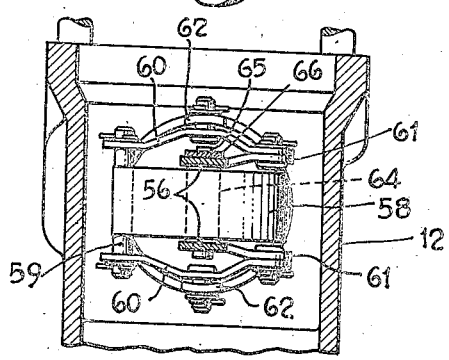

2,405,831

UNITED STATES PATENT OFFICE 2,405,831

TEMPERATURE AND PRESSURE CONTROL

Raymond W. Jensen, Los Angeles, Calif., assignor to The Garrett Corporation, Airesearch Manufacturing Company division, Los Angeles, Calif., a corporation of California Application January 21, 1944, Serial No. 519,159

11 Claims. (Cl. 236—34)

This invention relates generally to oil cooling systems for internal combustion engines and to controls for regulating the flow and temperature of oil from the cooler to the internal combustion engine within a range most satisfactory for efficient operation and lubrication of the engine, especially of the type used for aircraft.

Pressure lubricating systems for internal combustion engines are provided with heat exchanging means for regulating the heat of the lubricating oil and maintaining it within a proper and efficient heat range. The heat exchanger is provided with a bypass passage through which the oil from the engine may circumvent the heat exchanger when for any reason the oil is prevented from passing through the cooling system. Thermostatic valve means are often employed to control the flow of oil through the bypass passage. When such a thermostatic valve means is employed, the cooled oil from the heat exchanger and uncooled oil from the bypass passage flow past the valve means, the operation of which is controlled by the temperature of the oil. When a pressure build-up occurs in the bypass passage, owing to any condition which impedes the free flow of oil through the cooler, the valve is unseated to relieve the pressure, and held unseated until the valve is influenced to seat by the heat of the oil when the condition of impedance in the heat exchanger is corrected. A type of valve commonly used in lubricating systems of the class mentioned is known as "sylphon valve," which includes in its structure a bellows which forms a sealed expandable pressure chamber, which is subject to leakage and breakage and has a limited operating range.

The present invention relates to a valve structure for accomplishing temperature and pressure regulation which eliminates the use of bellows and hence obviates any possibility of failure thereof.

It is an object of the invention to provide a fluid cooling system combined with temperature and pressure control in which the possibility of failure of operation of the control is eliminated or reduced to a minimum.

It is also an object of the invention to provide a simple, efficient, and compact flow of oil and temperature control which is light and susceptible to complete interchangeability with other valves or control means employed in similar capacities.

A further object of the invention is to provide a control means having a greater operating range than valves similarly employed.

A further object of the invention is to provide a device in which the control means for the valve may be adjustably regulated to adapt the same to varying conditions and to increase the sensitivity of the same for the important purpose of extending the operating range and of making unnecessary a replacement or substitution of the control means where changing circumstances are encountered.

Further objects and advantages of the invention will be brought out in the following part of the specification.

Referring to the drawings which are for illustrative purposes only,

Fig. 1 is a vertical sectional view showing a control fitting embodying the invention and a portion of a cooler on which it may be mounted.

Fig. 2 is a horizontal sectional view taken as indicated by the line 2—2 of Fig. 1.

Fig. 3 is a vertical section taken as indicated by the line 3—3 of Fig. 2.

Fig. 4 is a vertical section taken as indicated by the line 4—4 of Fig. 3.

Fig. 5 is a view mostly in section taken on the line 5—5 of Fig. 1.

Fig. 6 is an elevational view of a modified form of the invention.

Fig. 7 is a section taken on the line 7—7 of Fig. 6.

Fig. 8 is a section taken on the line 8—8 of Fig. 7.

To the heat exchanger 10, which is illustrative of one form or type of cooler in which the valve arrangement herein described may be used, is connected a fitting 11 to which is secured a control fitting or housing 12, which is formed with an inlet chamber 13 to receive the oil from the engine. The chamber 13 of the housing 12 is formed with a port opening 14, which registers with an opening 15 in the fitting 11, providing a passageway for the hot oil from the engine to the heat exchanger 10, which, in the instance shown, is comprised of a core 16 of spaced tubes 16' with means for baffling the circuit of oil therethrough, and a muff or enveloping jacket 17. Entry of the oil to the core 16 from the jacket or muff is afforded by an opening 18. The aforementioned port or opening 15 is in direct communication with said muff or jacket 17, through a port 19 in the fitting 11 as shown in Fig. 5. The port opening 14 in the chamber 13, under normal conditions, is open, but under extraordinary conditions, as, for instance, in case of sudden pressure build-up of the oil, it is arranged to be closed to cause a relief of the pressure by bypassing it from said chamber 13 through a bypass 19' into a valve chamber 20, from which it travels through an outlet 21 from said chamber 20 to the engine, directly or indirectly. For effecting this relief from sudden pressure of the oil, a double valve 22 is provided in the chamber 13, and comprises a valve member 23 on one end of a stem 24 and a cylindrical valve 25 at the other end thereof. The cylindrical valve 25 is held normally seated on its seat 26 by a compression spring 27 disposed in the cylindrical hollow 28 of said valve 25 and contained within a chamber 29 in said fitting 12, said chamber being provided with a cap 30 against which the compression of said spring 27 occurs. The seat 26 for said valve 25 is in a port or opening 31 in said chamber 29 and when the valve 25 is unseated, said port establishes communication between the chamber 13 and the bypass chamber 19′, as shown in Figs. 1 and 2. The cylindrical valve 25 is provided with guide members 32, extending beyond the face thereof, and these guide members cooperate with the cylindrical portion of the valve and the opening 31 to maintain the same, and its companion valve 23 in position. When, for any reason, a pressure develops in the chamber 13 which is in excess of the pressure resisted by said spring 27, the cylindrical valve 25 is lifted against the tension of said spring 27 from its seat 26, while, concurrently, the valve 23 at the other end of the stem 24 is seated in the port or opening 14. This elevation of the double valve 22 opens communication between the chamber 13 and the bypass passage 19′, and thus relieves the pressure, in consequence whereof the valves 23 and 25 under the urge of the spring 27 return to normal position, as shown in Fig. 1.

The housing 12 is formed with a bypass chamber 33 which has an opening or port 33′ and a check valve 34 to prevent reverse flow therethrough. This bypass chamber 33 is essentially a pressure chamber, as explained hereinafter, and communicates with a bypass passage 35 in said fitting 11, this bypass passage 35 being in communication with the muff 17 and arranged to cause the oil to circumvent the heat exchanger 10. When, for any reason, the circuit of oil through the core 16 of the heat exchanger 10 is obstructed, the oil travels through or around one area of the muff and, being prevented from passing through the opening 18 to the core 16, continues its travel through the muff 17, and eventually enters the bypass chamber 33, through the bypass passage 35 in the housing 11 and the opening or port 33 in the housing 12. The circuit of the oil is indicated by arrowed lines in Fig. 1, as is also the travel of oil through the core of the heat exchanger.

For purposes of description, said chamber 33 may be considered a bypass. A chamber 20 of the housing 12 receives cooled oil from the heat exchanger 10 through a port 36 which is provided with the check valve 36′. The oil travels from said chamber 19 through the outlet port 21, for return by any desired course to the engine.

In this chamber 20 is arranged a thermostatically controlled valve structure, generally indicated by 37, for controlling the flow of uncooled oil through the opening 38, which is a communicating port between the bypass chamber 33 and the chamber 20. The valve structure 37 comprises a pressure responsive unit and a thermostatically operated valve, as hereinafter described.

The valve structure 37 has a valve member adapted to engage the seat surrounding the opening 38 for closing this opening. The valve member 39 is mounted upon a piston 40 to move relatively thereto and therewith. This piston 40 is connected by rods or posts 41 with a supporting slide member 42 which is slidably disposed within a cylinder of a cap 43 secured to said housing 12. A spring 44, positioned in the cylinder of the cap 43 exerts a pressure upon said slide member 42 to hold the same against a seat 45 in the cap 43 and to hold the associated elements of the valve structure in set position. As stated, the valve 39 is mounted on the piston 40. It has independent movement relatively thereto and such independent movement is effected by a thermal responsive means, such as a bi-metallic coil 46, connected at its outer end to the end of links 47 which are pivotally mounted in arms 48 of the valve 39. The opposite ends of said links 47 are pivotally connected to link members 49 which are secured to said piston 40. The inner end of the bi-metallic coil 46 is secured to a bar or other member 50, which is fixedly mounted on the rods 41.

The thermostatic unit or coil 46 responds to the influence of hot and cold oil or other fluid and, moving in either one or another direction, carries with it the valve 39 independently of the mount thereof or piston 40—that is, independently of the piston 40 and its associated parts, which in association with the valve 39 constitute a pressure responsive means. In order to use all of the power developed from the use of a bi-metal, it is highly important that the valve which is influenced by such bi-metal be balanced—that is, that pressures be equal on all sides or parts of the valve. For this purpose, the piston 40 has the same diameter as the valve seat 51, and the inner diameter of the valve 39 is also of the same diameter. The valve member 39 is cylindrical, as shown, and is formed with a central opening 52 which is diametrically smaller than the diametrical extent of the inner wall or face of the valve 39, and with an annular internal shoulder 53 which cooperates with the aforementioned piston 40 to limit the movement thereof in one direction, to-wit: away from its seat 51. The exterior diameter of the valve is greater than that of the seat 51, and the end thereof is tapered and formed with a spherical face 54, which facilitates its seating under adverse conditions. The piston 40 is also provided with a spherical periphery 40′ to enable the valve 39 to rotate and seat itself if it is not on center. The slide member 42 has an opening 55 to provide for a balance of pressure so that any increase in pressure occasioned by any failure in the cooler or heat exchanger will be exerted against the piston 40 and thus move the valve 39 from its seat, regardless of the pressure at which the spring 44 is set.

When an impedance or restriction to the flow of oil is offered by the heat exchanger or for other reasons, a pressure builds up in the bypass chamber 33 beyond a determined limit, and above such limit the spring 44 will be compressed, thus causing the entire valve structure to be moved from its seat 51 and relieving pressure from the heat exchanger.

In the unseated position of the valve 39, the fluid pressure in the bypass chamber 33 is balanced against the piston 40 and under this condition, the bi-metallic thermostatic coil 46, being influenced by the heat of the oil to expand, easily operates the valve member 39 to seating position. Reduced oil temperature will cause the thermostat to contract and thereby to open the valve. In the open position of the valve, the thermostat will be influenced by the temperature of the oil flowing through the chamber 33, which is uncooled, and the oil passing into the valve chamber 30, which is cooled, and obviously the valve 39 will remain open until the desirable operating temperature of the oil is reached, at which time the valve will seat and cause all of the oil to flow through the heat exchanger 19 to and through the valve chamber 20.

The invention as herein described provides a device which is light in weight, is interchangeable with the "sylphon" valve now used, eliminates the use of bellows and hence obviates the possibility of the failure of such bellows by leakage or breakage, has a greater operating range and requires no threaded parts.

A variation of the form of the invention, without alteration of the sense of the disclosure heretofore made, is illustrated in the form of embodiment shown in Figs. 6, 7, and 8, wherein like numerals of reference indicate like parts in all of the views in the drawings.

The valve structure 37 has a valve member 39 adapted to engage the seat surrounding the opening 38 for closing this opening. The valve member 39 is mounted upon a piston 40 to move relatively thereto and therewith as has been pointed out. This piston 40 is connected by bars 56 with a supporting slide member 42 which is slidably disposed within a cylinder of a cap 43 secured to said housing 12. The bars 56 are connected to the piston 40 and the piston member 42 by any desired means, such as screws 57, bolts, or welds. As stated, the valve 39 has independent movement relatively to the piston 40 and such independent movement is effected by a thermally responsive element, such as a bi-metallic coil 58. The outer or free end of said coil 58 is secured to a pin 59 which is carried in the ends of a pair of links 60. The other ends of said links 60 are pivotally connected to extensions 61 which are provided on said flat bars 56 and project therefrom at substantially right angles to the longitudinal axis of said bars. The intermediate or substantially the central portion of said links are pivotally connected to the ends of arms 62 which are integral or associated with the valve 39 in a desirable manner. The dead end 63 of the bi-metallic coil 58 is secured to a shaft 64 which extends through said flat bars 56 and is mounted for rotation therein, the purpose of this being set out presently.

The structure as thus defined provides a valve which is movable relatively to the stationary piston 40 by the bi-metallic coil, the expansive and contractive effort of which is translated to the end thereof, which connects with the free ends of the links 60. Since the links are pivotally attached at the other ends thereof to the extensions 61 of the flat bars 56, they are moved about such pivotal attachment and such movement is transferred to the valve 39. The arms 62 whereof, as explained, are pivotally associated with said links 60 intermediate their length.

For the purpose of rendering unnecessary replacements or substitutions of thermal coils to meet different conditions and to regulate the action of the coil, whereby it will respond sensitively and to a nicety to a wide range of requirements, I have provided means for controlling the tension of the coil. A means for this purpose is shown in Figs. 6, 7, and 8, and includes the aforementioned shaft 64 to which, as described, the dead end 63 of the coil 58 is secured and which is mounted for rotation in the flat bars 56. On the projecting end 65 of the shaft 64 is fitted an end of a key or lever 66 having at the outer end an arcuate flange 67 provided with perforations 68. When this key or lever 66 is moved in a circular plane in either one direction or another, the tension of the coil 58 through the medium of the shaft 64 to which the dead end thereof is connected, may be regulated in accordance with the range required to operate the valve. It is obvious, therefore, that this regulation is of considerable importance in a device of this type to accommodate the action of the bi-metallic coil to differing conditions, obviating thereby the need of substitutions for this purpose and the labor incident thereupon.

When the lever or key 66 has been manipulated to obtain the desired degree of tension of the coil, it is secured in position of adjustment by a locking means, such as a pin screw or bolt 69 carried in a lug 70 on one of said flat bars 56, which pin or screw 69 is arranged to fit into or pass through one of the perforations 68 in the arcuate flange 67.

Although I have shown but one form of my invention, it will be understood that various changes and modifications may be made without departing from the spirit and scope of the invention, and that the invention should be construed in accordance with the spirit and scope of the appended claims.

I claim as my invention:

1. A combined pressure and temperature controlled valve for controlling the flow of a viscous fluid through a bypass port of a heat exchanger having a normal heat exchange flow path, and a bypass, including said port, for circumventing said normal flow path, comprising: an annular valve element adapted to seat with reference to said port, a piston within said valve element and cooperating therewith to form a closure for said port, a temperature responsive connection between said piston and valve element for moving the latter with reference to the piston, and yielding means urging the piston to a predetermined position, said piston being movable against the force of said yielding means by pressure in said bypass and being adapted, when it thus moves, to operate said valve element, through said connection, to relieve said pressure.

2. A combined pressure and temperature controlled valve for controlling the flow of a viscous fluid through a bypass port of a heat exchanger having a normal heat exchange flow path, a valve chamber communicating with said port, and a bypass, including said port, for circumventing said normal flow path, comprising: an annular valve element adapted to seat with reference to said port, a piston within said valve element and cooperating therewith to form a closure for said port, a supporting member slidably mounted in said valve chamber and carrying said piston, yielding means urging said member and piston to a predetermined position, and a temperature responsive connection between said piston and valve element for moving the latter with reference to the piston, said piston being adapted to move against the force of said yielding means in response to pressure in said bypass and being adapted, when it thus moves, to operate said valve element, through said connection, to relieve said pressure.

3. A combined pressure and temperature controlled valve for controlling the flow of a viscous fluid through a bypass port of a heat exchanger having a normal heat exchange flow path and a bypass, including said port, for circumventing said normal flow path, comprising: an annular valve element adapted to seat with reference to said port, a piston within said valve element and cooperating therewith to form a closure for said port, means to yieldingly urge said piston and valve element towards a port closing position, and a temperature responsive connection between said piston and valve element for moving the latter with reference to the piston, said piston being yieldable in response to pressure in said bypass and adapted, when it thus yields, to operate said valve element, through said connection, to relieve said pressure.

4. A combined pressure and temperature controlled valve for controlling the flow of a viscous fluid through a bypass port of a heat exchanger having a normal heat exchange flow path and a bypass, including said port, for circumventing said normal flow path, comprising: an annular valve element adapted to seat with reference to said port, a piston within said valve element and cooperating therewith to form a closure for said port, means to yieldingly urge said piston and valve element toward a port closing position, and a bi-metallic coil forming a temperature responsive connection between said piston and valve element for moving the latter with reference to the piston, said piston being yieldable in response to pressure in said bypass and adapted, when it thus yields, to operate said valve element, through said connection, to relieve said pressure.

5. A combined pressure and temperature controlled valve for controlling the flow of a viscous fluid through a bypass port of a heat exchanger having a normal heat exchange flow path and a bypass, including said port, for circumventing said normal flow path, comprising: an annular valve element adapted to seat with reference to said port, a piston within said valve element and cooperating therewith to form a closure for said port, means for yieldingly urging said piston and valve element towards a port closing position, a thermostatic coil, one end of which is connected to said piston, and a lever pivoted on said valve element and connected at its respective ends to said piston and the other end of said coil, said lever and coil cooperatively forming a temperature responsive connection between said piston and valve element for moving the latter with reference to the piston, said piston being yieldable in response to pressure in said bypass and adapted, when it thus yields, to operate said valve element, through said connection, to relieve said pressure.

6. A combined pressure and temperature controlled valve for controlling the flow of a viscous fluid through a bypass port of a heat exchanger having a normal heat exchange flow path, and a bypass, including said port, for circumventing said normal flow path, comprising: an annular valve element adapted to seat with reference to said port, a supporting member within said valve element and on which said valve element is slidably mounted, said supporting member cooperating with said valve element to form a closure for said port, means for yieldingly urging said supporting member and valve element to a port closing position, and a temperature responsive connection between said supporting member and valve element for moving the latter with reference to said supporting member.

7. A combined pressure and temperature controlled valve for controlling the flow of a viscous fluid through a bypass port of a heat exchanger having a normal heat exchange flow path, and a bypass, including said port, for circumventing said normal flow path, comprising: an annular valve element adapted to seat with reference to said port, a supporting member within said valve element and on which said valve element is slidably mounted, said supporting member cooperating with said valve element to form a closure for said port, means for yieldingly urging said supporting member and valve element to a port closing position, a thermostatic coil, one end of which is connected to said support, and a lever pivoted on said valve element and connected at its respective ends to said supporting member and the other end of said coil, said lever and coil cooperatively forming a temperature responsive connection between said supporting member and valve element for moving the latter with reference to said supporting member.

8. A combined pressure and temperature controlled valve for controlling the flow of a viscous fluid through a bypass port of a heat exchanger having a normal heat exchange flow path and a bypass, including said port, for circumventing said normal flow path, comprising: an annular valve element adapted to seat with reference to said port, a supporting member within said valve element and on which said valve element is slidably mounted, said supporting member cooperating with said valve element to form a closure for said port, means for yieldingly urging said supporting member and valve element to a port closing position, a lever pivoted on said valve element and pivoted to said supporting member at one end, a bi-metallic thermostatic coil, the outer end of which is connected to the other end of said lever, a shaft connected to the center of said coil and journaled in said supporting member, and an adjusting element connected to said shaft and adapted to be connected to said supporting member in any one of several positions of adjustment about the axis of said shaft.

9. A combined pressure and temperature controlled valve for controlling the flow of a viscous fluid through a bypass port of a heat exchanger having a normal heat exchange flow path and a bypass, including said port, for circumventing said normal flow path, comprising: an annular valve element adapted to seat with reference to said port, a piston within said valve element and cooperating therewith to form a closure for said port, said piston having a spherical peripheral surface and said valve element having a cylindrical inner surface cooperating therewith to permit sliding and universally tilting movement of said valve element in seating with reference to said port, means for yieldingly urging said piston and valve element to a port closing position, and a temperature responsive connection between said piston and valve element for moving the latter with reference to the piston, said piston being yieldable in response to pressure in said bypass and adapted, when it thus yields, to operate said valve element, through said connection, to relieve said pressure.

10. A combined pressure and temperature controlled valve for controlling the flow of a viscous fluid through a bypass port of a heat exchanger having a normal heat exchange flow path and a bypass, including said port, for circumventing said normal flow path, comprising: a cylindrical tubular valve element having a spherical and roughly frusto-conical valve face adapted to seat in said port, a piston having a spherical rim surface fitted within said valve element, on which said valve element is slidable and universally tiltable to accommodate the seating of said valve face in said port, means for yieldingly urging said piston and valve element to a port closing position, a valve chamber communicating with said port, a supporting member slidably mounted in said chamber, means rigidly connecting said piston to said supporting member, and a thermo-responsive connection between said valve element and connecting means, for moving the valve element with reference to the piston, said piston being yieldable in response to pressure in said bypass and adapted, when it thus yields, to operate said valve element, through said connection, to relieve said pressure.

11. A valve as set forth in claim 10, wherein the rim surface of the piston has a diameter substantially equal to the diameter of said port, and wherein said valve element has an inwardly offset end portion on which said valve face is formed, said offset portion forming an internal shoulder serving as a stop to limit the movement of said piston in one direction within said valve element.

RAYMOND W. JENSEN.